Patented July 25, 1933

1,919,575

UNITED STATES PATENT OFFICE

CURT SCHÖNBURG, OF BITTERFELD, GERMANY, ASSIGNOR TO I. G. FARBENINDUSTRIE AKTIENGESELLSCHAFT, OF FRANKFORT-ON-THE-MAIN, GERMANY

PLASTIC MASS

No Drawing. Original application filed April 8, 1930, Serial No. 442,689, and in Germany April 8, 1929. Divided and this application filed July 9, 1931. Serial No. 549,809.

The present invention relates to a new composition of matter in which new phosphoric acid esters of glycol monoethers are mixed or colloidized with cellulose derivatives. The present application is a division of my copending application Ser. No. 442,689 concerning a method for producing the phosphoric acid esters of glycol ethers in question and their halogen derivatives. The incorporation of this new group of phosphoric acid esters in plastic masses of cellulose derivatives results in an improvement of various qualities of the latter, particularly inasmuch as they are rendered non-sensitive to the effects of low temperatures in a very high degree.

The tertiary phosphates of the uniform or mixed monoalkyl- (or aryl-) glycol-ethers are colorless substances having a high boiling point, which are difficulty inflammable and exceedingly stable.

The particular advantages of the phosphoric acid esters described, as distinguished from the known esters of glycol-ethers of organic acids, substantially reside in their higher boiling point and their smaller vapor tension. The lower homologues of the uniform esters, as, for instance, tri(ethoxyethyl) phosphate of the formula $(C_2H_5OC_2H_4)_3PO_4$ are water soluble, whereas the higher homologues are not; substitution of only a single ethoxyethyl group by the butoxyethyl group may already suffice to produce insolubility in water.

The principal point of importance with respect to these various homologues consists in that they are particularly suitable as gelatinizers and softeners for nitro- and acetyl-cellulose as well as for the most various cellulose esters and cellulose ethers; when employed in this manner the lower homologues display a greater dissolving capacity for the cellulose derivatives than the higher ones.

The dissolving efficiency of these products towards cellulose derivatives which is represented by their different gelatinizing effect upon the latter, may be regulated and utilized by correspondingly selecting the esterifying groups. Thus acetyl-cellulose is difficulty gelatinized by tri(butoxyethyl) phosphate of the formula:

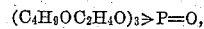

whereas di(methoxyethyl)butoxyethyl phosphate of the formula:

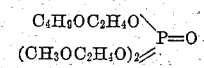

easily effects gelatinization. The number of technically useful gelatinizers for cellulose derivatives is thus materially increased.

The effect of the new compounds upon the plastic masses produced from cellulose derivatives is remarkable in many respects; in all cases inflammability of the masses is largely reduced. Further the addition of these substances to acetyl-cellulose increases the strength of the plastic masses, this increase being apparent from the raised pleating coefficient as well as the improvement of the coefficient of elongation and the maximum number of bendings sustained. Most remarkable, however, is the fact that the plasticity of these masses is affected by low temperatures only to an extent which can be entirely neglected when compared with the masses which were hitherto produced from acetyl-cellulose by means of known gelatinizers, as the brittleness of those masses is regularly strongly increased when the latter are subjected to low temperatures. Finally, also the fastness to light of the masses rendered plastic by means of the new esters is superior to that of masses hitherto known.

In further pursuance of the invention I have found that phosphoric acid esters of such glycolmonoethers which contain a halogen, for instance chlorine or bromine, have the same external appearance as the products made from non-substituted glycol-ethers and are also capable of acting as gelatinizers and softeners. Moreover, they cause a further reduction of inflammability in the plastic masses made from acetyl-cellulose. They are advantageously employed in combination with the nonhalogenized esters, as masses displaying a remarkable clarity result therefrom.

The new gelatinizers and softeners above described are employed in the art of producing plastic masses in exactly the same manner in which such agents are generally applied in the celluloid or acetyl-cellulose art. They may also be used either by themselves or in combination with known softeners such as triacetin, phthalic acid ester etc. The proportion to be added is, also with respect to the new substances, substantially governed by the qualities to be attained in the final products.

The new phosphoric acid esters may further be advantageously substituted for the known softeners in the production of nitro- or cellon lacquers as they leave a colorless clear coating after the organic solvents have evaporated; the coating, besides the known good qualities, has the further advantage of being highly fast to light and resistant to cold.

The following examples serve to illustrate my invention without limiting it to the specific details given therein.

*Example 1*

When mixtures consisting of
(a) 75 percent of acetyl-cellulose
   25 percent of tri(methoxyethyl)phosphate
or
(b) 75 percent of acetyl-cellulose
   25 percent of di(methoxyethyl)butoxyethylphosphate
or
(c) 52,5 percent of acetyl-cellulose
   17,5 percent of di(methoxyethyl)butoxyethylphosphate
   30,0 percent of a white pigment of titanic oxide, are worked into films (cellon films) in a known manner, films are obtained which after evaporation of the solvents are superior to films which are produced with the aid of the softeners formerly known, by virtue of their high resistance to the influence of mechanical stresses such as occur in operations involving a pleating, distending or bending of the products. A further advantage of the new films resides in that their brittleness at zero temperature and below does not increase in the same degree as is the case with the films hitherto known.

*Example 2*

75 parts of acetyl-cellulose, 10 parts of di(methoxyethyl)butoxyethylphosphate, 15 parts of tri(chloroethyl)phosphate of the formula:

$$(ClCH_2CH_2O)_3{-}P{=}O$$

are worked into cellon films in the manner known per se with the usual solvents. The product is a remarkably clear cellon film showing no opalescence whatever, and a strongly reduced inflammability.

*Example 3*

Instead of the acetyl-cellulose compositions employed in the preceding examples the following composition proves equally suitable:

75 parts of acetyl-cellulose, 20 parts of monochloroethyl methoxyethyl butoxyethyl phosphate of the formula:

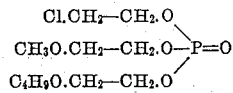

5 parts of di(methoxyethyl)butoxyethylphosphate.

As mentioned above, my invention is not limited to the foregoing examples and valuable plastic masses are likewise obtainable when using the other neutral phosphates of glycolmonoethers described in my copending specification Serial No. 442,689. These glycol ethers from which I enumerate, for instance, tri(ethoxyethyl)phosphate, tri(phenoxyethyl)phosphate, tri(butoxypropyl)phosphate, di(ethoxyethyl)butylphosphate, di(chloroethyl)ethoxyethylphosphate, and chloroethyl methoxyethyl butyl phosphate, are equivalents of those applicable according to the foregoing examples.

These compounds may be represented by the general formula:

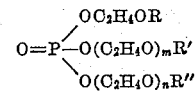

wherein R is alkyl, halogenoalkyl or phenyl and $m$ and $n$ stand for 0 or 1. In this formula the ethylene radicle $C_2H_4$ may be substituted by, for instance, propylene. These homologues are intended to be in the scope of the claims following hereafter.

I claim:

1. A composition of matter comprising a cellulose derivative and a neutral phosphoric acid ester of a monoglycol ether of the general formula

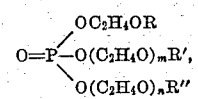

where R, R' and R'' represent alkyl halogenoalkyl or phenyl, and $m$ and $n$ stand for 0 or 1.

2. A composition of matter comprising acetyl cellulose and a neutral phosphoric acid ester of a monoglycol ether of the general formula

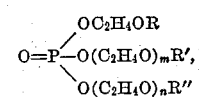

wherein R, R' and R'' represent alkyl, halogenalkyl or phenyl, and $m$ and $n$ stand for 0 or 1.

3. A composition of matter comprising a cellulose derivative and a neutral phosphoric acid ester of a monoglycol ether of the general formula $$O=P\begin{cases}OC_2H_4OC_4H_9\\O(C_2H_4O)_mR',\\O(C_2H_4O)_nR''\end{cases}$$

wherein R' and R'' represent alkyl, halogenoalkyl or phenyl, and $m$ and $n$ stand for 0 or 1.

4. A composition of matter comprising acetyl cellulose and a neutral phosphoric acid ester of a monoglycol ether of the general formula $$O=P\begin{cases}OC_2H_4OC_4H_9\\O(C_2H_4O)_mR',\\O(C_2H_4O)_nR''\end{cases}$$

wherein R' and R'' represent alkyl, halogenoalkyl or phenyl, and $m$ and $n$ stand for 0 or 1.

5. A composition of matter comprising a cellulose derivative and a neutral phosphoric acid ester of a monoglycol ether of the general formula $$O=P\begin{cases}OC_2H_4OC_4H_9\\OC_2H_4OCH_3,\\O(C_2H_4O)_mR\end{cases}$$

wherein R represents alkyl, halogenoalkyl or phenyl and wherein $m$ means 0 or 1.

6. A composition of matter comprising acetyl cellulose and a neutral phosphoric acid ester of a monoglycol ether of the general formula $$O=P\begin{cases}OC_2H_4OC_4H_9\\OC_2H_4OCH_3\\O(C_2H_4O)_mR\end{cases}$$

wherein R represents alkyl, halogenoalkyl or phenyl and wherein $m$ means 0 or 1.

7. A composition of matter comprising a cellulose derivative and the phosphoric acid ester of the formula $$O=P\begin{cases}OC_2H_4OC_4H_9\\OC_2H_4OCH_3\\OC_2H_4OCH_3\end{cases}$$

8. A composition of matter comprising acetyl cellulose and the phosphoric acid ester of the formula $$O=P\begin{cases}OC_2H_4OC_4H_9\\OC_2H_4OCH_3\\OC_2H_4OCH_3\end{cases}$$

CURT SCHÖNBURG.